United States Patent [19]
Bell

[11] Patent Number: 5,226,972
[45] Date of Patent: Jul. 13, 1993

[54] METHODS AND MEANS FOR CLEANING AND COOLING PRODUCE

[75] Inventor: Laurence D. Bell, Carmel Valley, Calif.

[73] Assignee: Transfresh Corporation, Salinas, Calif.

[21] Appl. No.: 554,177

[22] Filed: Jul. 13, 1990

Related U.S. Application Data

[60] Continuation of Ser. No. 940,908, May 21, 1985, abandoned, which is a division of Ser. No. 736,645, May 21, 1985, Pat. No. 4,962,777.

[51] Int. Cl.⁵ .............................................. B08B 7/00
[52] U.S. Cl. ................................. 134/25.1; 134/25.3; 134/26; 134/30; 134/32; 426/518
[58] Field of Search ............. 134/25.1, 25.3, 26, 134/30, 32; 99/470, 517, 536; 426/510

[56] References Cited

U.S. PATENT DOCUMENTS

| | | | |
|---|---|---|---|
| 1,024,763 | 4/1912 | Anderson | 62/380 X |
| 1,708,253 | 4/1929 | Bell et al. | 62/380 |
| 1,852,144 | 4/1932 | Brogden | 134/25.3 |
| 1,932,827 | 10/1933 | Morris et al. | 134/380 X |
| 1,945,922 | 2/1934 | Stebler | 134/25.3 |
| 2,066,013 | 12/1936 | Murphy et al. | 62/91 X |
| 2,072,865 | 3/1937 | Bryant | 134/25.3 |
| 2,834,188 | 5/1958 | Bradford | 62/91 |
| 3,521,459 | 7/1970 | Rath | 62/91 X |
| 4,271,683 | 6/1981 | Williams | 62/91 X |
| 4,301,659 | 11/1981 | Martin et al. | 62/63 X |
| 4,962,777 | 10/1990 | Bell | 134/63 |

Primary Examiner—Asok Pal

[57] ABSTRACT

Subdivided produce is washed, before cooling, in water containing an oxidizing agent at a sufficiently high temperature and for a time sufficient to remove deterioration-causing agents. Thereafter, the subdivided, washed produce is cooled with cool, humidified air that passes over, through and around the produce to reduce its temperature below 40° F.

13 Claims, 3 Drawing Sheets

METHODS AND MEANS FOR CLEANING AND COOLING PRODUCE

This application is a continuation of application Ser. No. 06/940,908 filed May 21, 1985, now abandoned which is a division of U.S. Pat. application Ser. No. 06/735,645, filed May 21, 1985, now U.S. Pat. No. 4,962,777.

FIELD OF THE INVENTION

The present invention relates generally to the treatment of produce, and more particularly to a method and apparatus for treating produce, preferably subdivided produce, before packaging, to preserve its freshness of appearance, to improve its crispness and flowability, to slow its deterioration, and facilitate its packaging.

BACKGROUND OF THE INVENTION

Preferably, subdivided produce, such as produce used in institutional or retail salads, for example, should be cooled, processed and packaged promptly to reach the ultimate consumer in good condition. Much commercially-grown produce, such as lettuce and cauliflower, for example, is produced in places distant from the ultimate consumer. Often several days elapse before the ultimate consumer receives the produce. During this time, such produce often suffers substantial deterioration, making the produce unfit for sale or consumption.

One method for reducing produce losses is so-called "vacuum cooling," where produce is cooled in a reduced pressure environment before packaging. Vacuum cooling lengthens produce life, and may also slow the growth of bacteria and fungi. Unfortunately, vacuum cooling is expensive.

Another method for reducing produce losses calls for washing the produce in chilled wash water. Chilling the water is expensive, however, and cold water is of limited effectiveness in dissolving debris that can cause deterioration. Moreover, where such washing is done in conjunction with vacuum cooling, the overall processing costs are high.

SUMMARY OF THE INVENTION

The methods of this invention comprise the steps of subdividing fresh produce by such techniques as cutting, slicing, chopping, dicing or slicing the produce; washing the produce with water, preferably with water comprising an oxidizing agent such as chlorine or a chloride, at a temperature sufficiently high, and for a time sufficient to remove such deterioration-causing agents as bacteria, fungi, liquids and solids emitted by the produce itself, sugars and other cellular debris on the surface of the produce before cooling the produce; where necessary or desirable, removing surface water by known techniques such as centrifuging and blowing air across the wetted surfaces of the produce; and then cooling the produce to a temperature substantially below the washing temperature, and preferably in the range of about 34° F. to about 40° F., by directing cool, preferably humidified air through, over and around the produce. Preferably, the produce is placed on means for conveying the produce over means for directing the cool, preferably humidified air upwardly against the produce, particularly where the produce is a leafy vegetable such as lettuce, cabbage or spinach.

These methods are particularly useful for cleaning and cooling such produce as lettuce, cabbage, spinach, cauliflower, broccoli and carrots, but may also be used with other fruits and vegetables. Indeed, these methods may also be used with produce that is not subdivided, such as lettuce heads from which the core and wrapper leaves have been removed.

Washing the produce, before cooling, at temperatures sufficiently high, and for a time sufficient to remove deterioration-causing agents from the produce, and to solubilize or wash off fungi, bacteria, sugars, liquids and solids issuing from the produce itself, and other cellular debris, is preferably done at temperatures above 40° F., and preferably at temperatures in the range of about 50° F. to about 75° F. For subdivided lettuce, a water-washing temperature of about 60° F., has proved highly effective.

In preferred embodiments, the concentration of oxidizing agent in the wash water is in the range of about 10 to about 50 parts per million or higher.

After washing the produce, but before cooling the produce, and depending upon the nature of the produce, removal of surface water from the produce, as by centrifugation, forced-air drying, or other known techniques, may be necessary or desirable. Removal of surface water from subdivided lettuce, by centrifugation, or otherwise, is preferred.

After washing, and, if necessary or desirable, drying the produce, the produce is then cooled by directing cool, preferably humidified air over, around and through the produce to cool the produce to a temperature in the range of about 34° F. to about 38° F. Preferably, the relative humidity of the cooling air is at least 80%, and, more preferably, is 90% or greater.

In preferred embodiments, the mass of cool, humidified air is directed, upwardly, over, through and around the produce as the produce moves along a path through a zone that minimizes contact of the produce with ambient air, or other liquids or gases. In treating subdivided lettuce and cabbage, the subdivided produce is preferably moved through such a zone in layers of sufficient thickness to permit the cool, humidified air to pass through, over and around the produce, and cool the produce to the desired temperature range. Preferably, these layers of produce have a thickness in the range of about 3 to about 6 inches; the layers have a width in the range of about one to about four feet; and undergo cooling for a time in the range of about one to about five minutes. The cool, preferably humidified air is directed against the produce at a pressure in the range of about 0.2 to about two inches of water.

During the cooling step, surface moisture on the produce is reduced, and the crispness and flowability of the produce restored, particularly where the produce is a leafy vegetable such as lettuce, cabbage or spinach. After cooling, the crisp, flowable produce is ready for packaging. Conventional packaging machines for packaging in plastic bags, trays, tubes or other enclosures may be used. Packaged produce may also be subjected to vacuum, filled with a preservative atmosphere and sealed. Packages filled with preservative atmospheres preferably are sufficiently permeable to permit the transmission of specific gases into and out of the packages at temperatures in commercially-encountered environments.

The apparatus of this invention comprises means for conveying subdivided produce along a linear path; means for directing flow of humidified, cool air, under pressure, and at a temperature in the range of about 33° F., to about 40° F., against the surface of the subdivided produce as the subdivided produce moves along the linear path. The apparatus is preferably placed within means for housing the conveying means for minimizing impingement of other gases, liquids or solids on said conveying means. Preferably, the housing means and the conveying means are joined by means for directing the flow of cool, humidified air against, over and through the produce, and for minimizing escape or other loss of the cool, humidified air from the apparatus. Preferably, the apparatus also includes means for continuously cooling and humidifying air flowing through the housing means.

DESCRIPTION OF THE DRAWINGS

FIG. 5 is an exploded detail view of a portion of the apparatus shown in FIG. 4.

DESCRIPTION OF A PREFERRED EMBODIMENT

Recently, a growing market for subdivided produce in readily usable form has developed. For example, hospitals, schools, restaurants and other institutions want subdivided salad materials such as undressed coleslaw, celery and carrot sticks, chopped and sliced lettuce, to avoid subdividing the produce themselves. Unfortunately, subdivided produce, particularly subdivided lettuce and cabbage, has a tendency to spoil more quickly than whole, undivided produce.

The apparatus and methods of this invention provide quicker, more effective, less costly methods and means for producing fresh, subdivided produce having extended shelf life, good appearance, and good resistance to deterioration by comparison to produce subjected to vacuum cooling or vacuum cooling/cold washing techniques.

In a preferred embodiment, utilizing the apparatus of this invention, whole produce such as lettuce has its core and outer, wrapper leaves removed. Thereafter, the cored, wrapperless lettuce is cut, slided, shredded or otherwise subdivided as desired. Simultaneously, or later, the produce is sprayed with warm, chlorinated wash water at a temperature sufficiently high, and for a time sufficient to solubilize or otherwise wash away bacteria, fungi, undesirable liquids and solids issuing from the produce itself, and other cellular debris. Preferably, the wash water is at a temperature in the range of about 55° F., to about 70° F., and more preferably, the wash water is, at least initially, at about 60° F. Following cutting and washing, moisture on the produce is removed by a method such as centrifuging, or passing air under pressure over the surface of the produce.

Figure 1:
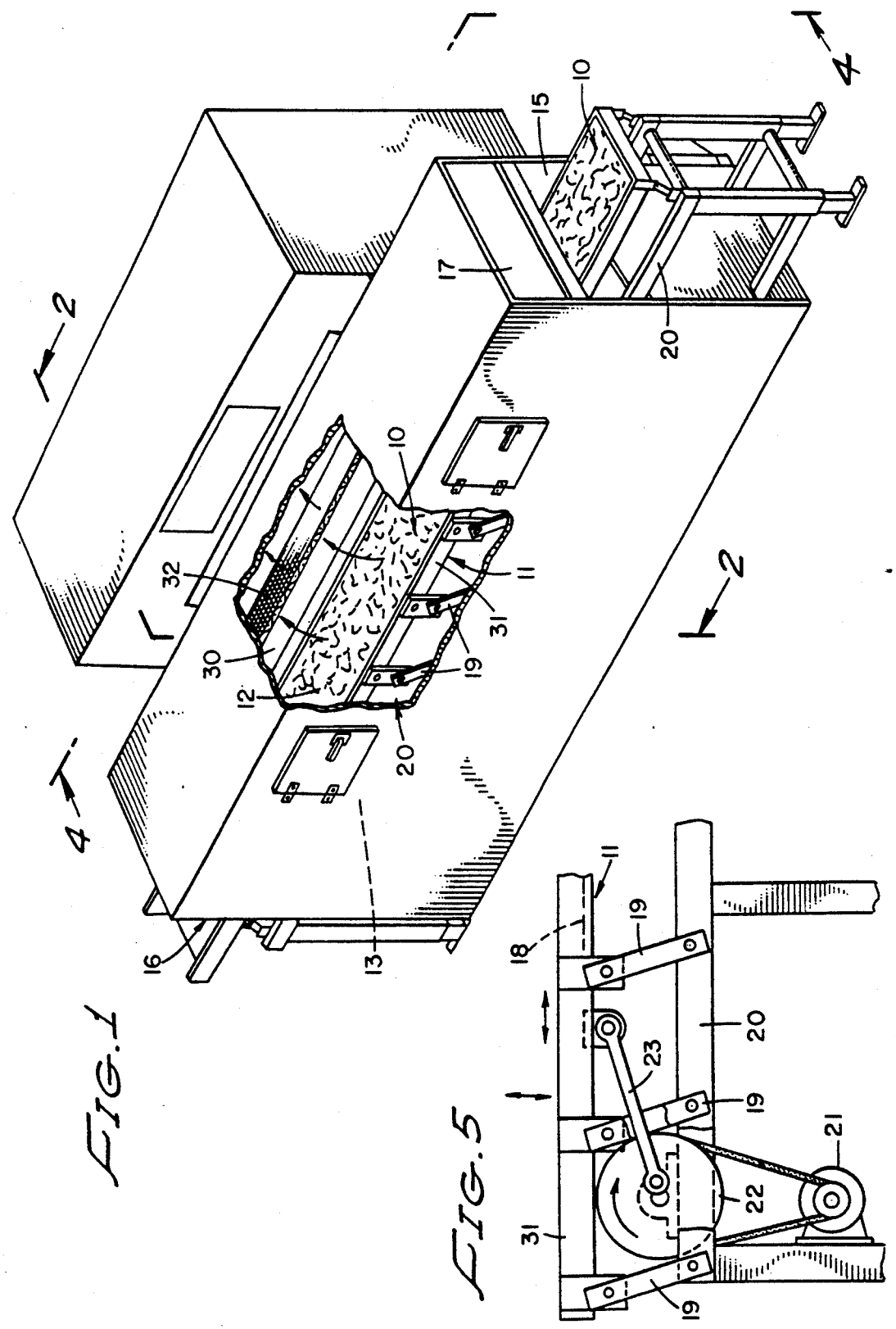
FIG. 1 is a perspective, partially fragmentary view of a preferred embodiment of the apparatus of this invention.
Figures 2, 3:
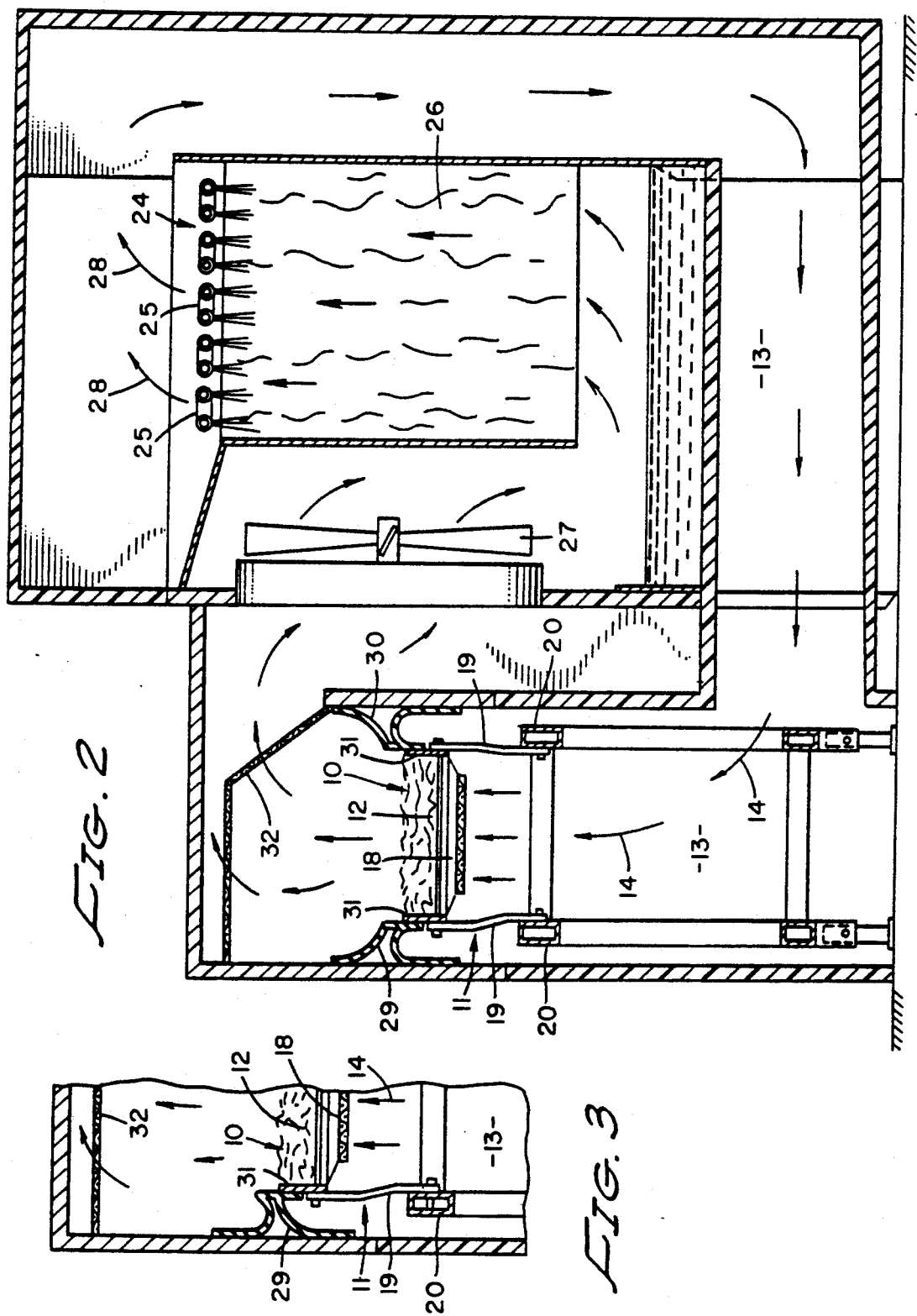
FIG. 2 is an end elevation view, in cross-section, of the apparatus shown in FIG. 1, taken on line 2—2 of FIG. 1.
FIG. 3 is an exploded detail view of a portion of the apparatus illustrated in FIG. 2.
Figure 4:
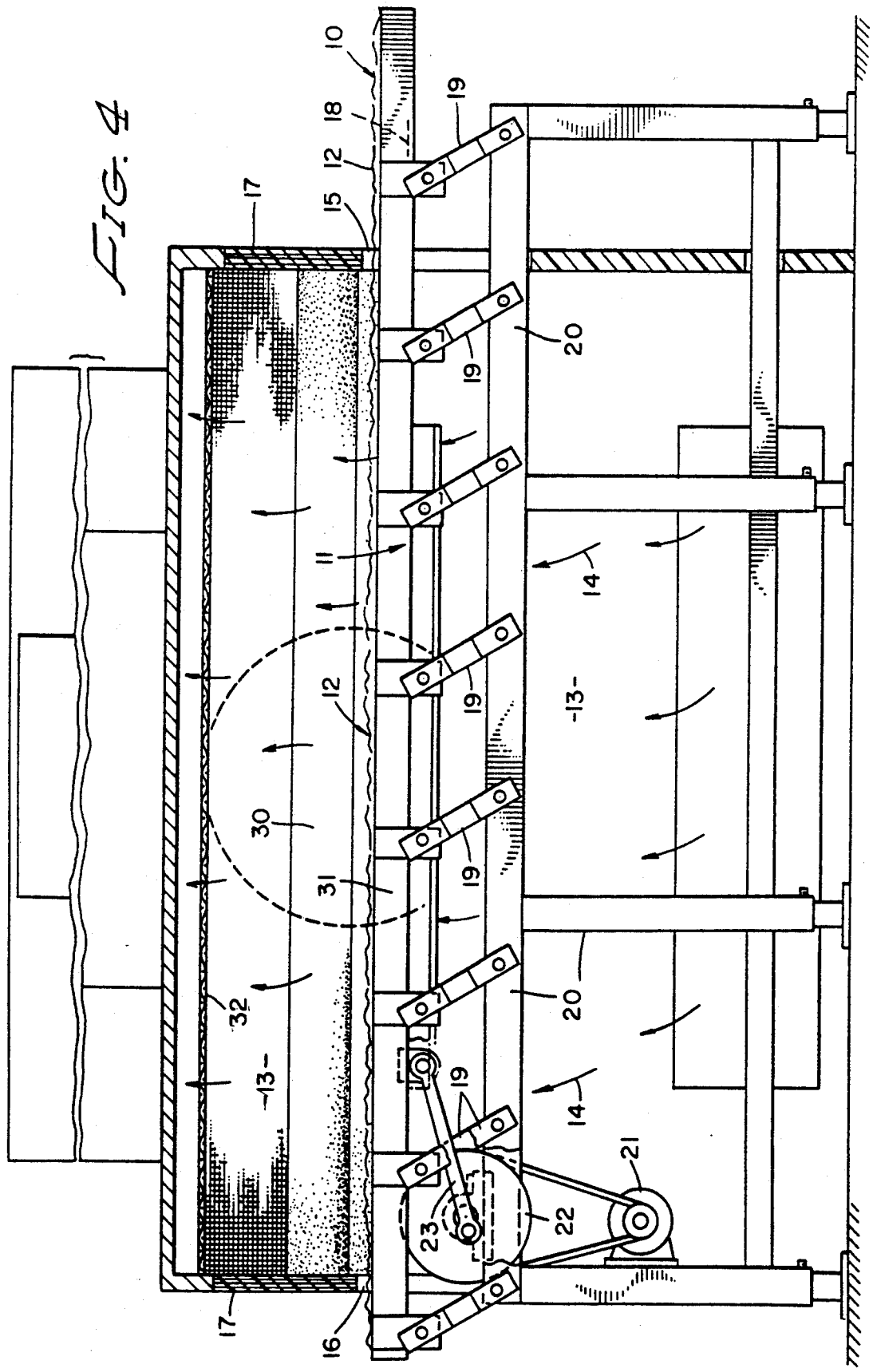
FIG. 4 is a side elevation view, in cross-section, taken on line 4—4 of FIG. 1, of the apparatus shown in FIG. 1.

As shown in FIGS. 1-5, after cutting, washing and, as necessary, drying, produce 10 is placed on conveyor 11 in the form of a layer having a thickness in the range of about 3 to about 6 inches. Conveyor 11 is a so-called "shaker" conveyor that moves the produce by means of a series of oscillations. As seen in FIGS. 1, 2 and 4, while the produce is conveyed through chamber 13, upwardly-directed, cool, humidified air, generally designated as 14 in FIG. 2, passes over, through and around produce layer 12, rapidly cooling the layer to a temperature in the range of about 34° F., to about 38° F., while removing surface moisture from the produce and restoring its crispness and flowability.

Cooling chamber 13 is made of metal panels having sealed seams, preventing or at least minimizing inflow and outflow of unwanted gases and liquids into chamber 13. Flexible curtains 17, one at chamber entrance 15, and one at chamber exit 16, hang downwardly to a point close to, but just above the upper surface of produce layer 12, minimizing inflow of ambient air and other unwanted gases and liquids into chamber 13, and minimizing adverse effects on the desired temperature and humidity inside chamber 13.

FIGS. 4 and 5 show one side of conveyor 11. The opposite side is constructed identically. Conveyor surface 18, made of a mesh screen or other foraminous material, is supported at its upper end by a plurality of shaker arms 19. The other ends of shaker arms 19 are pivotally connected to support frame 20. Motor 21 rotates drive plate 22, linked to conveyor surface 11 by rod 23, to produce a cyclic oscillation or shaking of conveyor 11 as produce moves along conveyor 11. The speed of produce movement along conveyor 11 is determined by the speed of motor 21. In preferred embodiments, a rotational drive speed in the range of about 300 to about 340 revolutions per minute causes produce to move from one end of a 25-foot long conveyor to the other in a time in the range of about one to about five minutes.

FIG. 2 shows the inside of cooling chamber 13 viewed in the direction that produce moves. At the top right of FIG. 2 is cooling apparatus 24 with a plurality of downwardly-directed sprays from water jets 25. These fine water sprays are directed upon a filamentary, cellular heat exchanger 26 through which air, driven by fan 27, moves upwardly against the water flow from jets 25. Cool, humidified air 28 exits through a set of manifolds that directs the flow of cool, humidified air against the lower surface of produce layer 12 on conveyor 11 at a pressure in the range of about 0.2 to about two inches of water. The oscillating or shaking action of conveyor 11 facilitates the cooling and drying of the produce, which emerges from chamber 13 at exit means 16 cooled to a temperature in the range of about 34° F., to about 38° F. The temperature of the produce emerging from chamber 13 may vary depending on the temperature of the produce just before entering chamber 13, the thickness and density of produce layer 12 in the chamber, and the pressure, temperature and relative humidity of the cool, moist air passing through the produce.

As FIGS. 2 and 3 show, panels 29 and 30 extend between the chamber and manifold walls, and seal against conveyor side walls 31, insuring that the cool, moist air passes through the produce layer 12 on conveyor 11, and does not escape. Porous baffle 32 extends over conveyor 11 above produce 12, and prevents produce from blowing off the conveyor and into fan 27, which recirculates the air to cooling chamber 28.

In the preferred embodiment of this apparatus, the conveyor 11 is 24 inches wide. Produce layer 12 has a thickness in the range of about 3 to about 6 inches and extends from one edge of the conveyor belt to the other.

Cool, moist air passing over and through the produce layer preferably has a temperature in the range of about 32.5° F., to about 35° F., and is directed against the produce layer at a pressure in the range of about 0.2 to about two inches of water. Conveyor 11 moves produce through chamber 13 at the rate of about 100 to about 200 feet per minute. In this way, about 6,000 pounds per hour of cut lettuce can be treated in this apparatus to preserve its freshness of appearance, to restore its crispness and flowability, and to enhance its resistance to deterioration.

After cooling, the humidified produce can be hand- or machine-packed into any one of a number of sealable packages. Such produce exhibits a shelf life that it is longer than the shelf life obtained with produce subjected to vacuum cooling and cold water washing. Moreover, subdivided lettuce so treated tends to have a higher water content than subdivided lettuce subjected to vacuum cooling and cold water washing, and has a cleaner and fresher appearance for a longer period of time.

What is claimed is:

1. A method for cleaning and cooling leafy produce selected from the group consisting of lettuce, cabbage and spinach that has been cut, sliced, chopped, diced or sliced into produce pieces comprising washing said produce with a washing medium at a temperature substantially below the boiling point of water, but sufficiently high, and substantially above 40° F., and for a time sufficient to remove deterioration-causing agents on the surface of said produce; forming a layer of at least partially overlapping pieces of said produce on a conveyor; and conveying said produce layer through a cooling zone while directing cool, humidified air against and through said produce layer to reduce the temperature of said produce layer from the temperature of washing to a temperature in the range above the freezing point of water and below about 40° F.

2. The method of claim 1 further comprising agitating said produce layer during said conveying to enhance removal of surface liquid from said produce layer.

3. The method of claim 1 further comprising using water comprising an oxiding agent for said washing.

4. The method of claim 1 further comprising maintaining the initial temperature of the washing medium used for said washing in the range of about 50° F. to about 75° F.

5. The method of claim 1 wherein, after said washing, and before said cooling, centrifuging said subdivided produce.

6. The method of claim 1 further comprising forming said layer to a thickness in the range of about 3 to about 6 inches.

7. The method of claim 1 wherein said washing medium is water.

8. A method comprising forming, on conveying means, a layer of at least partially overlapping pieces of leafy produce selected from the group consisting of lettuce, cabbage and spinach having surface liquid thereon that suppresses crispness and flowability of said layer of produce; and directing cool, humidified air under pressure against and through said produce layer at a pressure and temperature and for a time sufficient to col said produce to a temperature substantially lower than the initial temperature of said produce and to remove enough surface liquid from said produce layer to enhance substantially its crispness and flowability.

9. The method of claim 8 further comprising agitating said produce layer during said conveying to enhance removal of surface liquid from said produce layer.

10. A method comprising forming, on conveying means, a layer of at least partially overlapping pieces of washed leafy produce selected from the group consisting of lettuce, cabbage and spinach having a temperature substantially above 40° F., and having surface liquid on said pieces and conveying said produce layer through a cooling zone while directing cool, humidified air against and through said produce layer to reduce the temperature of said produce to a temperature in the range above the freezing point of water and below about 40° F., and to remove a substantial amount of said surface liquid therefrom.

11. The method of claim 10 further comprising agitating said produce layer during said conveying to enhance removal of surface liquid from said produce layer.

12. A method for cooling leafy produce selected from the group consisting of lettuce, cabbage and spinach that has been formed into produce pieces before said cooling comprising forming, on conveying means, a layer of at least partially overlapping pieces of produce that having surface liquid comprising water on said pieces, and conveying said produce layer through a cooling tunnel while directing cool air under sufficient pressure to pass against and through said produce layer to reduce the temperature of sad produce and to remove a substantial quantity of sad surface liquid.

13. The method of claim 12 further comprising agitating said produce layer during said conveying to enhance the cooling and removal of surface liquid from said layer of produce.

* * * * *